United States Patent [19]
Walsh

[11] Patent Number: 5,031,503
[45] Date of Patent: Jul. 16, 1991

[54] ELECTROSTATIC PROJECTILE ACCELERATOR APPARATUS AND RELATED METHOD

[75] Inventor: John B. Walsh, Wichita, Kans.
[73] Assignee: The Boeing Company, Seattle, Wash.
[21] Appl. No.: 446,636
[22] Filed: Dec. 6, 1989
[51] Int. Cl.⁵ .............................................. F41B 6/00
[52] U.S. Cl. ........................................ 89/8; 328/233; 376/130
[58] Field of Search ................. 89/8; 124/3; 250/251; 313/360.1, 363.1; 315/111.81; 328/233; 376/113, 127, 129, 130

[56] References Cited

U.S. PATENT DOCUMENTS

| | | | |
|---|---|---|---|
| 2,272,374 | 2/1942 | Kallmann et al. | 313/360.1 |
| 2,880,337 | 3/1959 | Langmuir et al. | 328/233 |
| 3,361,980 | 1/1968 | Kane | 328/233 |
| 3,509,419 | 4/1970 | Berg | 328/233 |
| 3,617,789 | 11/1971 | Middleton et al. | 376/129 |
| 3,761,828 | 9/1973 | Pollard et al. | 328/227 |
| 4,076,993 | 2/1978 | Nowak | 313/360 |
| 4,209,704 | 6/1980 | Krimmel | 376/127 |
| 4,429,612 | 2/1984 | Tidman et al. | 89/8 |
| 4,765,222 | 8/1988 | Pinson | 89/8 |

Primary Examiner—Stephen C. Bentley
Attorney, Agent, or Firm—Finnegan, Henderson, Farabow, Garrett & Dunner

[57] ABSTRACT

An electrostatic projectile accelerator apparatus and related method for accelerating an electrostatic projectile charged to a first polarity through a plurality of pairs of split plates. The pairs of split plates are alternately charged to the first polarity and a second polarity opposite the first polarity. A first ion generator neutralizes the polarity of the projectile or charges the projectile to the second polarity as the projectile passes through the first pair of split plates. A second ion generator recharges the projectile to the first polarity as the projectile passes through the second pair of split plates.

16 Claims, 4 Drawing Sheets

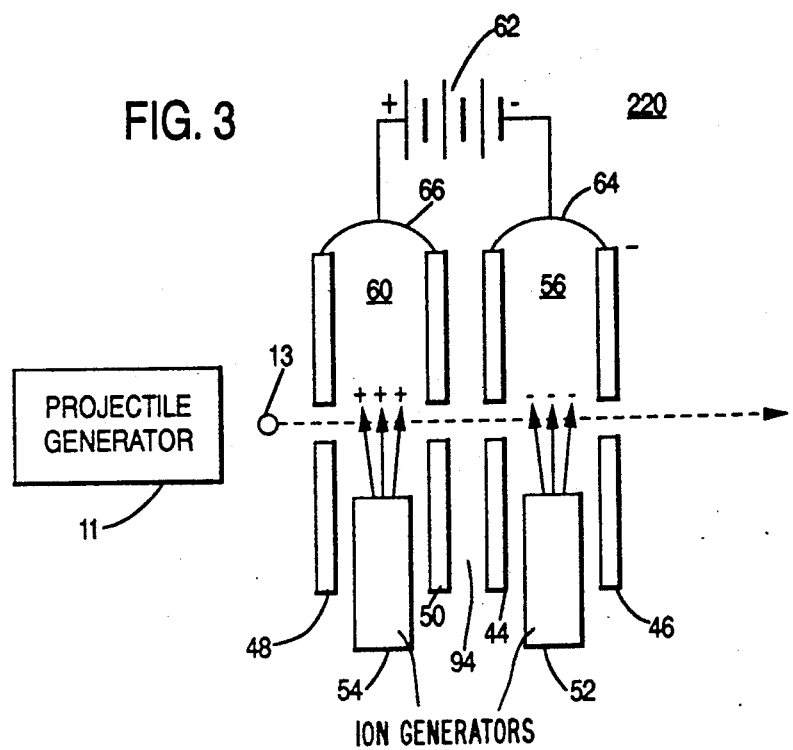
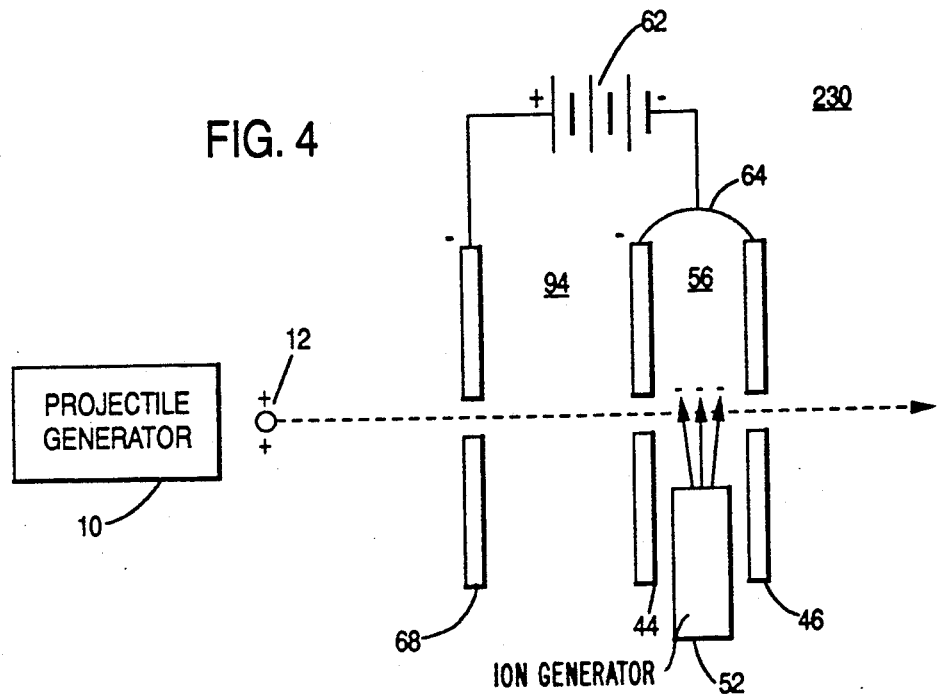

ELECTROSTATIC PROJECTILE ACCELERATOR APPARATUS AND RELATED METHOD

BACKGROUND OF THE INVENTION

I. Field of the Invention

The present invention relates generally to an electrostatic projectile accelerator apparatus and related method and, more specifically relates to such apparatus and method for accelerating a projectile through a plurality of stages using split plates. The accelerator apparatus may be employed, for example, in a vacuum chamber or in free space.

II. Description of Related Art

Previous projectile accelerators are known, the most common of which are various forms of chemically-activated guns. The maximum projectile velocity attainable by such guns is limited by the speed of the propagation of the shockwave generated by the guns. Alternative apparatus, such as multi-stage, chemically activated guns for sequentially accelerating the projectile have also been employed, but such apparatus are also limited in the projectile velocities attainable.

Electrostatic projectile accelerators are known wherein a high voltage source establishes an electric field between a single pair of electrode plates. A charged projectile is introduced through a hole in the first plate, and is accelerated by the electric field toward the second plate, where the projectile passes through an exit hole. The electric field in such accelerators can be arranged to be confined essentially between the first and second plates of the pair, thereby reducing deceleration of the charged projectile after the projectile passes through the exit hole. Such electrostatic projectile accelerators, however, require extremely high voltages in order to attain a significant projectile velocity, because the projectile velocity attainable is proportional to the square root of the voltage applied to the accelerator.

Alternative electrostatic projectile accelerators have been proposed to attain desired projectile velocities without requiring excessive voltages. Such accelerators typically utilize several acceleration regions to achieve high projectile velocities with a lower voltage source. However, such accelerators inherently include deceleration regions between the acceleration regions which can significantly decrease the projectile velocity, thereby greatly undermining the efficiency of such accelerators. The deceleration regions can be reduced by using a separate voltage supply for each electrostatic plate; however such configuration would be tantamount to using a single high voltage supply, as described above.

Electromagnetic accelerators may be useful as an alternative. However, such accelerators require heavy electromagnets as well as the expenditure of excessive amounts of power to establish magnetic fields, much of which is dissipated as heat.

SUMMARY OF THE INVENTION

Accordingly, it is an object of the present invention to provide a projectile accelerator apparatus and related method which do not require the use of electromagnets or extremely high voltages to attain a desired projectile velocity.

Another object of the present invention is to provide a projectile accelerator apparatus and related method wherein the projectile attains desired velocities without requiring an excessively high voltage source.

A further object of the present invention is to provide a projectile accelerator apparatus and related method which significantly reduce the presence of deceleration regions, thereby improving the efficiency of projectile acceleration.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purposes of the invention, as embodied and broadly described herein, the invention comprises a projectile accelerator apparatus and method including a projectile generator for generating an uncharged projectile. A first pair of split plates having a first polarity is provided, the projectile being propelled by the projectile generator into the space between the two plates. In this space the projectile is charged to the same polarity as the plates by a separate charging mechanism. A second pair of split plates is positioned some distance from the first pair of split plates and is charged to a second polarity, the projectile being accelerated from an exit hole in the first set of plates to an entrance to the second pair of split plates. A charge generator, such as a first ion generator, is positioned between the first pair of split plates, for charging the projectile to the first polarity as the projectile passes through the first pair of split plates. A charge neutralizer, such as a second ion generator, is positioned between the second pair of split plates, and neutralizes the polarity of the projectile as the projectile passes through the second pair of split plates.

In a second preferred embodiment, the projectile generator may launch a charged projectile, the first charge generator can be eliminated, and the first pair of split plates replaced by a single plate.

The apparatus thus far described is a single acceleration stage apparatus. To provide additional stages of acceleration, and additional velocity, additional split plates may be provided adjacent each other, alternate of the additional split plates being charged to the first polarity and alternate of the additional split plates being charged to the second polarity. In such an embodiment, additional neutralizers (or, alternatively, chargers) are provided between the additional split plates charged to the second polarity, and additional rechargers (or, alternatively, neutralizers) are provided between the additional split plates charged to the first polarity.

The accompanying drawings, which are incorporated in and constitute a part of this specification, illustrate the preferred embodiments of the invention and together with the description, serve to explain the principles of the invention.

BRIEF DESCRIPTION OF THE DRAWINGS

FIG. 3 illustrates a first preferred embodiment of a single-stage electrostatic projectile accelerator apparatus embodying the teachings of the present invention;

FIG. 4 illustrates a second preferred embodiment of a single-stage electrostatic projectile accelerator apparatus embodying the teachings of the present invention;

DESCRIPTION OF THE PREFERRED EMBODIMENTS

Figure 1:
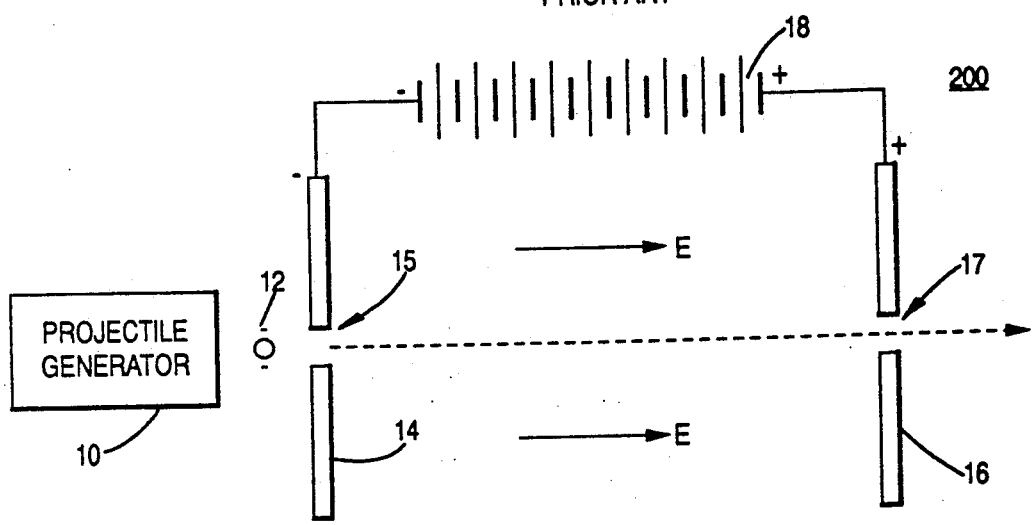
FIG. 1 illustrates a first conventional electrostatic projectile accelerator apparatus.

Reference will now be made in detail to the presently preferred embodiments of the invention, examples of which are illustrated in the accompanying drawings. Wherever possible, the same reference numbers will be used throughout the drawings to refer to the same or like parts. All polarities illustrated in the drawings are solely for convenience and can be reversed.

FIG. 1 illustrates a conventional projectile accelerator 200 including a projectile generator 10, a plate 14 including an entrance hole 15 and being charged to a negative polarity, a plate 16 including an exit hole 17 and being charged to a positive polarity, and a high voltage source 18. Projectile generator 10 generates a charged projectile 12. The specific composition of projectile 12 is not limiting provided that projectile 12 can be electrically charged. Projectile 12 is illustrated in FIG. 1 as having a negative polarity.

High voltage source 18 supplies a large negative voltage to plate 14 and a high positive voltage to plate 16, thereby creating an electric field E between plates 14, 16. Projectile 12 is output from projectile generator 10 and passes through hole 15 in plate 14. Negatively charged projectile 12 is then repelled by negatively charged plate 14 and attracted by positively charged plate 16, causing projectile 12 to accelerate toward plate 16; the momentum of projectile 12 carrying it through hole 17. Although the acceleration of projectile 12 is effected by accelerator 200, accelerator 200 of FIG. 1 is limited in that extremely high voltages must be applied to plates 14, 16 by high voltage source 18 to create a sufficiently strong electric field E between plates 14, 16 to accelerate projectile 12.

Figure 2:
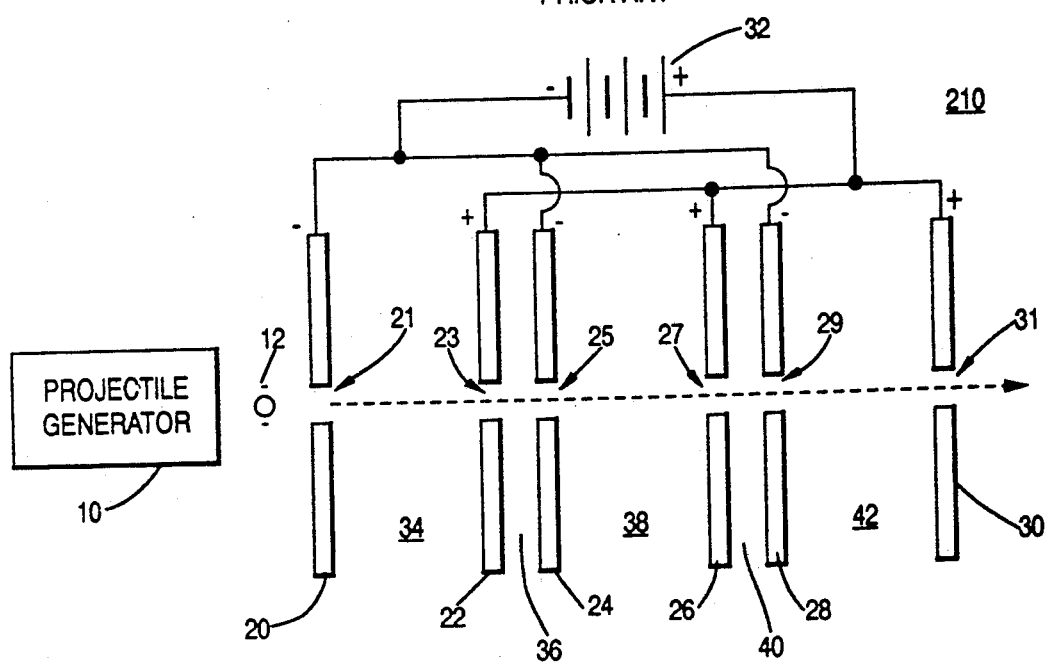
FIG. 2 illustrates a second conventional electrostatic projectile accelerator apparatus.

FIG. 2 illustrates a second conventional projectile accelerator 210 including projectile generator 10 for generating charged projectile 12, which is intended to require a lower voltage than accelerator 200. A plurality of split plates 22, 24; and 26, 28, and single plates 20, 30 are provided adjacent projectile generator 10, plates 20, 24, 28 being charged to a negative polarity and plates 22, 26, 30 being charged to a positive polarity. Plates 20, 22, 24, 26, 28, 30 are charged by respective terminals of a moderate voltage source 32. An acceleration region 34 is defined between plates 20, 22; an acceleration region 38 is defined between plates 24, 26; and an acceleration region 42 is defined between plates 28, 30. A deceleration region 36 is defined between plates 22, 24 and a deceleration region 40 is defined between plates 26, 28. Holes 21, 23, 25, 27, 29, 31 are provided in plates 20, 22, 24, 26, 28, 30, respectively, to permit passage of projectile 12.

Projectile 12 is output from projectile generator 10 through hole 21 in plate 20. Projectile 12 is then repelled by negatively charged plate 20 and is attracted by positively charged plate 22, causing projectile 12 to accelerate through acceleration region 34. Projectile 12 then enters deceleration region 36 as it passes through hole 23 in plate 22. In deceleration region 36, projectile 12 is attracted by positively charged plate 22 and repelled by negatively charged plate 24 and therefore decelerates. As a result, substantially all of the acceleration gained by projectile 12 in acceleration region 34 is lost as projectile 12 passes through deceleration region 36. After decelerating through deceleration region 36, projectile 12 passes through hole 25 in plate 24 into acceleration region 38. In acceleration region 38, projectile 12 is repelled by negatively charged plate 24 and attracted by positively charged plate 26. As a result, projectile 12 accelerates through acceleration region 38. Projectile 12 again decelerates in deceleration region 40 in which it is attracted by positively charged split plate 26 and repelled by negatively charged split plate 28, thereby losing the acceleration gained in acceleration region 38. Projectile 12 accelerates again through acceleration region 42 as it is attracted by positively charged plate 30 and repelled by negatively charged plate 28. Projectile 12 exits accelerator 210 through hole 31 in plate 30.

Accelerator 210 illustrated in FIG. 2 avoids the need for an extremely high voltage source, as required by accelerator 200 illustrated in FIG. 1, because the acceleration of projectile 12 through acceleration regions 34, 38, 42 is cumulative. However, deceleration regions 36, 40 substantially decrease the overall acceleration of projectile 12 and therefore greatly reduce the efficiency of accelerator 210, yielding no more acceleration than accelerator 200 for equal voltage sources 18, 32.

A first preferred embodiment of a single-stage electrostatic projectile accelerator 220 embodying the teachings of the present invention is illustrated in FIG. 3. As discussed above in connection with FIGS. 1 and 2, projectile generator 11 is provided to project an uncharged projectile 13. An example of a satisfactory projectile generator is a compressed air gun. Accelerator 220 further includes a first pair of plates 44, 46, and a second pair of plates 48, 50, a first ion generator 54, a second ion generator 52, and a voltage source 62. Plates 48, 50 are each charged to a positive polarity by voltage source 62 and together comprise a first split plate 66. Plates 44, 46 are each charged to a negative polarity by voltage source 62 and together comprise a second split plate 64. First ion generator 54 is positioned between first pair of plates 48, 50 and outputs positive ions. Second ion generator 52 is positioned between second pair of plates 44, 46 and outputs negative ions.

Uncharged projectile 13 is output from projectile generator 11 and is propelled through the hole in plate 48. Projectile 13 then passes through the hole in plate 48 into region 60. First ion generator 54 outputs positive ions into region 60 which charge projectile 13 to a positive polarity. First ion generator 54 thus comprises charging means, positioned between second pair of plates 48, 50, for positively charging projectile 13 as it passes through first split plate 66. Because projectile 13 is positively charged as it passes through the hole in plate 50 into region 94, acceleration occurs in region 94 due to positively charged plate 50 and negatively charged plate 44.

As projectile 13 enters region 56, second ion generator 52 outputs negative ions into region 56 which neutralize projectile 13 to a neutral polarity. Second ion generator 52 thus comprises opposite charging means, positioned between first pair of plates 44, 46, for neutralizing the polarity of projectile 13 as it passes through second split plate 64. Neutrally charged projectile 13 then exits accelerator 220 through the hole in plate 46.

FIG. 4 illustrates a second preferred embodiment of a single-stage electrostatic projectile accelerator 230 embodying the teachings of the present invention. As discussed above in connection with FIG. 3, projectile generator 10 is provided to generate projectile 12, this time charged. Projectile 12 is here shown, for purposes of illustration only, as having a positive polarity. Accelerator 230 further includes plates, 44, 46, 68, an ion generator 52, and a voltage source 62. Plate 68 is charged to a positive polarity by voltage source 62. Plates 44, 46 are each charged to a negative polarity by voltage source 62 and together comprise split plate 64. Ion generator 52 is positioned between plates 44, 46 and outputs negative ions.

Projectile 12 is output from projectile generator 10 and is propelled through the hole in plate 68 into region 94. Because projectile 12 is positively charged as it passes through the hole in plate 68 into region 94, acceleration occurs in region 94 due to positively charged plate 68 and negatively charged plate 44.

As projectile 12 enters region 56, ion generator 52 outputs negative ions into region 56 which neutralize projectile 12 to a neutral polarity. Ion generator 52 thus comprises opposite charging means, positioned between pair of plates 44, 46, for neutralizing the polarity of projectile 12 as it passes through split plate 64. Neutrally charged projectile 12 then exits accelerator 230 through the hole in split plate 46.

Figure 5:
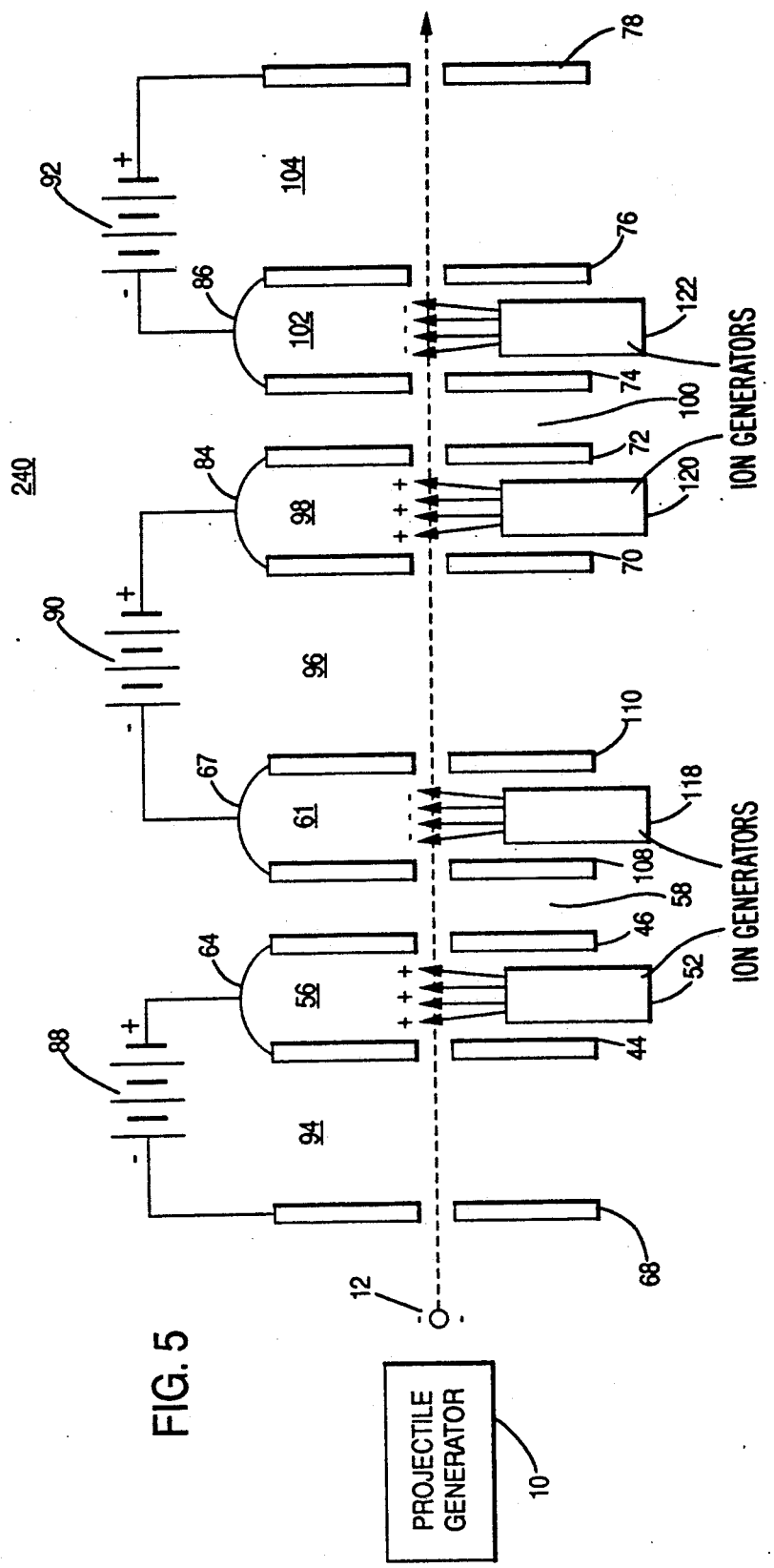
FIG. 5 illustrates a first preferred embodiment of a multi-stage electrostatic projectile accelerator apparatus embodying the teachings of the present invention.

FIG. 5 illustrates a first preferred embodiment of a multi-stage electrostatic projectile accelerator 240 embodying the teachings of the present invention. Accelerator 240 includes projectile generator 10 for generating a projectile 12 having a negative polarity and plates 44, 46, 68, and ion generator 52, as discussed above in connection with FIG. 4, and further includes plates 108, 110; 70, 72; and 74, 76, ion generators 118, 120, 122, and voltage sources 88, 90, 92. Plates 108, 110 are each charged to a negative polarity and together comprise split plate 67. Plates 70, 72 are each charged to a positive polarity and together comprise split plate 84. Plates 74, 76 are each charged to a negative polarity and together comprise split plate 86. Ion generator 118 is positioned between plates 108, 110 and outputs negative ions, that is, ions having the same polarity as the original polarity of projectile 12, into region 61. Ion generator 120 is positioned between plates 70, 72 and outputs positive ions, that is, ions having a polarity opposite the original polarity of projectile 12, into region 98. Ion generator 82 is positioned between plates 74, 76 and outputs negative ions, that is, ions having the same polarity as the original polarity of projectile 12, into region 102.

Voltage source 88 applies a negative charge to plate 68 and a positive charge to split plate 64. Voltage source 90 applies a negative charge to split plate 67 and a positive charge to split plate 84. Voltage source 92 applies a negative charge to split plate 86 and a positive charge to plate 78. Although three separate voltage sources 88, 90, 92 are illustrated in FIG. 5, a common voltage source can be used to simplify the configuration of accelerator 240.

As negatively charged projectile 12 is output from projectile generator 10 through the hole in plate 68, projectile 12 is accelerated through region 94 by the repulsion by negatively charged plate 68 and the attraction by positively charged plate 44. As discussed above in connection with FIG. 4, the polarity of projectile 12 is neutralized in region 56 by positive ions output from ion generator 52, thereby minimizing deceleration in region 58. Projectile 12 is recharged to a negative polarity in region 61 by negative ions output from ion generator 118 and is then accelerated through region 96 by the repulsion from negatively charged plate 110 and the attraction by positively charged plate 70. Ion generator 120 then neutralizes the polarity of projectile 12 in region 98 with positive ions output from ion generator 120, after which projectile 12 passes through region 100 without decelerating, is recharged to a negative polarity in region 102 by negative ions output from ion generator 122, and is accelerated through region 104 by the repulsion from negatively charged plate 76 and the attraction by positively charged plate 78. Projectile 12 then exits accelerator 240 through the hole in plate 78.

Single-stage accelerator 220 in FIG. 3 and single-stage accelerator 230 in FIG. 4 may thus be modified, as illustrated by accelerator 240 in FIG. 5, to further comprise a plurality of additional split plates positioned adjacent each other, alternate of the additional split plates having the same polarity as the polarity of projectile 12 and alternate of the additional split plates having a polarity opposite the polarity of projectile 12. Additional neutralizing means are positioned between the additional split plates having a polarity opposite the polarity of projectile 12 for neutralizing the polarity of projectile 12 as it passes through the additional split plates. Additional recharging means are positioned between the additional split plates having the same polarity as the polarity of projectile 12 for recharging projectile 12 to its initial polarity as projectile 12 passes through the additional split plates.

Accelerator 240 therefore attains desired velocities of projectile 12 without the need for a high voltage source due to the cumulative acceleration of projectile 12 and the lack of decreased acceleration caused by deceleration regions, as discussed above in connection with FIG. 2.

Figure 6:
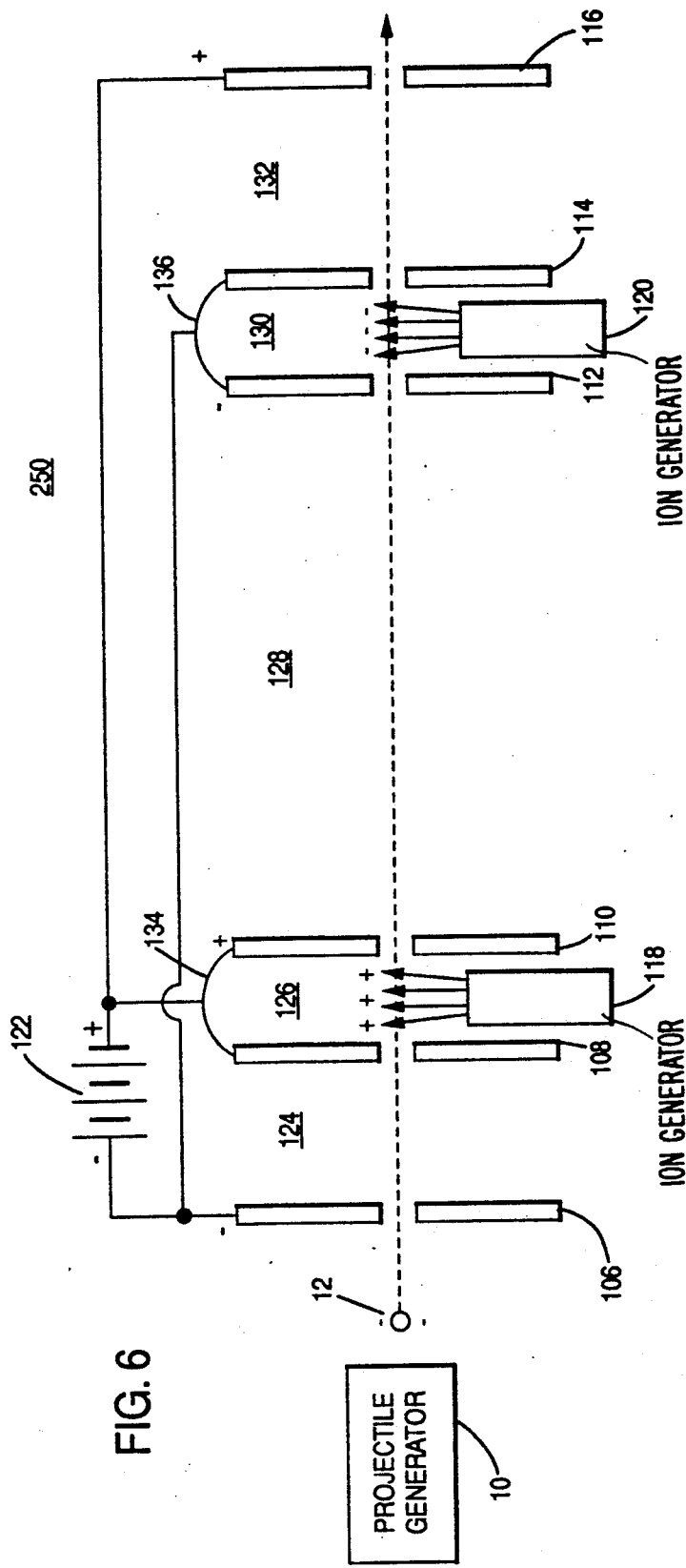
FIG. 6 illustrates a second preferred embodiment of a multi-stage electrostatic projectile accelerator apparatus embodying the teachings of the present invention.

FIG. 6 illustrates a second preferred embodiment of a multi-stage electrostatic projectile accelerator 240 embodying the teachings of the present invention. In addition to projectile generator 10 which generates a negatively charged projectile 12, accelerator 240 further includes plates 106, 108, 110, 112, 114, 116, ion generators 118, 120, and voltage source 122. Plates 108, 110 are each charged to a positive polarity and together comprise split plate 134. Plates 112, 114 are each charged to a negative polarity and together comprise split plate 136. Ion generator 118 is positioned between split plates 134 and outputs positive ions, that is, ions having a polarity opposite the polarity of projectile 12, into region 126. Ion generator 120 is positioned between split plates 136 and outputs negative ions, that is, ions having the same polarity as the polarity of projectile 12, into region 130. Voltage source 122 applies a negative charge to plate 106 and split plate 136. Voltage source 122 applies a positive charge to split plate 134 and plate 116.

As discussed above in connection with FIG. 5, negatively charged projectile 12 is output from projectile generator 10 and is accelerated through region 124 by the repulsion from negatively charged plate 106 and the attraction by positively charged plate 108. However, unlike ion generator 52 illustrated in FIG. 5, ion generator 118 illustrated in FIG. 6 outputs positive ions sufficient to charge projectile 12 to a positive polarity, that is, a polarity opposite its initial polarity. Ion generator 118 thus comprises charging means, positioned between split plates 134, for charging projectile 12 to a polarity opposite its initial polarity as projectile 12 passes through split plate 134. Positively charged projectile 12 is then repulsed by positively charged plate 110 and attracted by negatively charged plate 112, and is thereby accelerated through region 128. Projectile 12 is then recharged to a negative polarity in region 130 by negative ions output by ion generator 120 and is accelerated in region 132 by the repulsion by negatively charged plate 114 and the attraction by positively charged plate 116. Projectile 12 exits accelerator 250 through the hole in plate 116.

By charging negative projectile 12 to a positive polarity in region 126, accelerator 250 not only achieves optimum velocity of projectile 12 due to the lack of deceleration regions, but also eliminates the need for a high voltage source due to the cumulative acceleration of projectile 12 attainable using lower voltage sources.

Accelerator 240 of FIG. 5 may thus be modified, as illustrated by accelerator 250 in FIG. 6, to include a plurality of additional split plates, positioned adjacent each other, alternate of the additional split plates having the same polarity as the polarity of projectile 12, and alternate of the additional split plates having a polarity opposite the polarity of projectile 12. Such a modification includes a plurality of additional chargers, positioned between the additional split plates having a polarity opposite the polarity of projectile 12, for charging projectile 12 to a polarity opposite the polarity of projectile 12 as projectile 12 passes through the additional split plates. Such a modified accelerator also includes a plurality of additional rechargers, positioned between the additional split plates having the same polarity as the polarity of projectile 12, for recharging projectile 12 to its initial polarity as projectile 12 passes through the additional split plates.

Positive and negative ion sources can also be connected together through a voltage source having the same voltage as source 122, in order to address the problem of each ion generator having to dispose of ions of a polarity opposite to those injected into the apparatus.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A projectile accelerator apparatus, comprising:
means for projecting a projectile;
a first pair of plates having a first polarity, said projectile being propelled through said first pair of plates;
a second pair of plates positioned adjacent said first pair of plates and having a second polarity opposite said first polarity, said projectile being accelerated through said second pair of plates;
charging means, positioned between said first pair of plates, for charging said projectile to said first polarity as said projectile passes through said first pair of plates;
neutralizing means, positioned between said second pair of plates, for neutralizing the polarity of said projectile as said projectile passes through said second pair of plates;
a plurality of additional pairs of plates positioned adjacent each other, alternate of said additional pairs of plates having said first polarity and alternate of said additional pairs of plates having said second polarity;
a plurality of additional charging means, positioned between said additional pairs of plates having said first polarity, for charging said projectile to said first polarity as said projectile passes through said additional pairs of plates; and
a plurality of additional neutralizing means, positioned between said additional pairs of plates having said second polarity, for neutralizing the polarity of said projectile as said projectile passes through said additional pairs of plates.

2. A projectile accelerator apparatus, comprising:
means for generating and projecting a projectile having a first polarity;
a first pair of plates having a second polarity opposite said first polarity, said projectile being projected through a region between the first pair of plates;
a second pair of plates positioned adjacent said first pair of plates and having said first polarity, said projectile being projected through a region between the second pair of split plates;
charging means, positioned between said first pair of plates, for charging said projectile to said second polarity as said projectile passes through said first pair of plates;
recharging means, positioned between said second pair of plates, for recharging said projectile to said first polarity as said projectile passes through said second pair of plates;
a plurality of additional pairs of plates positioned adjacent each other, alternate of said additional pairs of plates having said first polarity and alternate of said additional pairs of plates having said second polarity;
a plurality of additional charging means, positioned between said additional pairs of plates having said second polarity, for charging said projectile to said second polarity as said projectile passes through said additional pairs of plates; and
a plurality of additional recharging means, positioned between said additional pairs of plates having said first polarity, for recharging said projectile to said first polarity as said projectile passes through said additional pairs of plates.

3. A method of accelerating a projectile, comprising the steps of:
generating a projectile having a first polarity using generating means;
accelerating said projectile through a single first plate positioned adjacent said generating means and having said first polarity;
accelerating said projectile through a region between said first plate and a second pair of plates positioned adjacent said first pair of plates and having a second polarity opposite said first polarity;
neutralizing the polarity of said projectile as said projectile passes through said second pair of plates;
accelerating said projectile through a plurality of additional pairs of plates positioned adjacent each other, alternate of said additional pairs of plates having said first polarity and alternate of said additional pairs of plates having said second polarity;

charging said projectile as said projectile passes through said additional pairs of plates having said first polarity; and neutralizing said polarity of said projectile as said projectile passes through said additional pairs of split plates having said second polarity.

4. A method of accelerating a projectile, comprising the steps of:
generating a projectile having a first polarity using generating means;
projecting said projectile through a single split plate positioned adjacent said generating means and having said first polarity;
accelerating said projectile through a first pair of plates having a second polarity opposite said first polarity;
charging said projectile to said second polarity as the projectile passes through said first pair of plates;
accelerating said projectile through a second pair of plates positioned adjacent said first pair of plates and having said first polarity;
recharging said projectile to said first polarity as said projectile passes through said second pair of plates;
accelerating said projectile through a plurality of additional pairs of plates positioned adjacent each other, alternate of said additional pairs of plates having said first polarity and alternate of said additional pairs of plates having said second polarity;
charging said projectile to said second polarity as said projectile passes through said additional pairs of plates having said second polarity; and
recharging said projectile to said first polarity as said projectile passes through said additional pairs of plates having said first polarity.

5. A projectile accelerator apparatus comprising:
means for propelling a projectile along an axis, the projectile being chargeable with a polarity;
means for setting the polarity of the projectile to a first polarity;
a first plate having the first polarity and a hole coaxial with the axis, the first plate being proximate the propelling means to permit propelling the projectile through the hole;
second and third plates each having a second polarity opposite the first polarity and a hole coaxial with the axis, the first and second plates being spaced to permit polarity-induced acceleration, the third plate being spaced from the second plate opposite the first plate and the propelling means; and
means positioned between the second and third plates, for altering the polarity of the projectile.

6. The apparatus of claim 5,
wherein the apparatus further comprises a fourth plate charged with the first polarity intermediate the projectile generating means and the first plate; and
wherein the polarity setting means comprises means, positioned between the fourth and first plates, for charging the projectile with the first polarity.

7. The apparatus of claim 5,
wherein the polarity setting means is associated with the projectile propelling means; and
wherein the altering means substantially neutralizes the polarity of the projectile.

8. The apparatus of claim 5,
wherein the polarity setting means is associated with the projectile propelling means; and
wherein the altering means reverses the polarity of the projectile so that it is charged to the second polarity.

9. The apparatus according to claim 5, wherein the plates are substantially parallel to each other.

10. The apparatus according to claim 5, wherein the altering means comprises means for generating ions having a polarity opposite the first polarity.

11. The apparatus according to claim 6, wherein the altering means substantially neutralizes the polarity of the projectile.

12. The apparatus according to claim 6, further comprising:
additional plates having holes, the additional plates being oriented in pairs, and the pairs of plates being positioned with the holes coaxial with the axis, the first pair of plates adjacent to but spaced from the third plate and additional pairs of plates adjacent to but spaced from each other, alternate of the pairs of additional plates having the first polarity and the second polarity respectively; and
additional altering means positioned between the pairs of additional plates.

13. The apparatus according to claim 7, further comprising:
additional plates having holes, the additional plates being oriented in pairs, and the pairs of plates being positioned with the holes coaxial with the axis, the first pair of plates adjacent to but spaced from the third plate and additional pairs of plates adjacent to but spaced from each other, alternate of the pairs of additional plates having the first polarity and the second polarity respectively;
additional charging means, positioned between the additional pairs of plates having the first polarity, for charging the projectile to the first polarity; and
additional altering means, positioned between the additional pairs of plates having the second polarity, for substantially neutralizing the polarity of the projectile.

14. The apparatus according to claim 8, further comprising:
additional plates having holes, the additional plates being oriented in pairs, and the pairs of plates being positioned with the holes coaxial with the axis, the first pair of plates adjacent to but spaced from the third plate and additional pairs of plates adjacent to but spaced from each other, alternate of the pairs of additional plates having the first polarity and the second polarity respectively; and
additional charging means, positioned between the additional pairs of plates for charging the projectile to the same polarity as the respective pair of plates.

15. A method of accelerating a projectile, comprising the steps of:
propelling a projectile having a first polarity;
projecting the projectile through a first plate having the first polarity;
accelerating the projectile between the first plate and the second plate, the second plate being charged with a second polarity opposite the first polarity;
charging a third plate located adjacent to the second plate with the same polarity as the second plate, thereby coasting the particle between the second plate and the third plate; and
altering the polarity of the projectile during coasting.

16. The method of claim 15, further comprising repeating the steps of sequentially accelerating, coasting and altering the polarity of the projectile between additional plates oriented in pairs.

* * * * *